Figure 1:
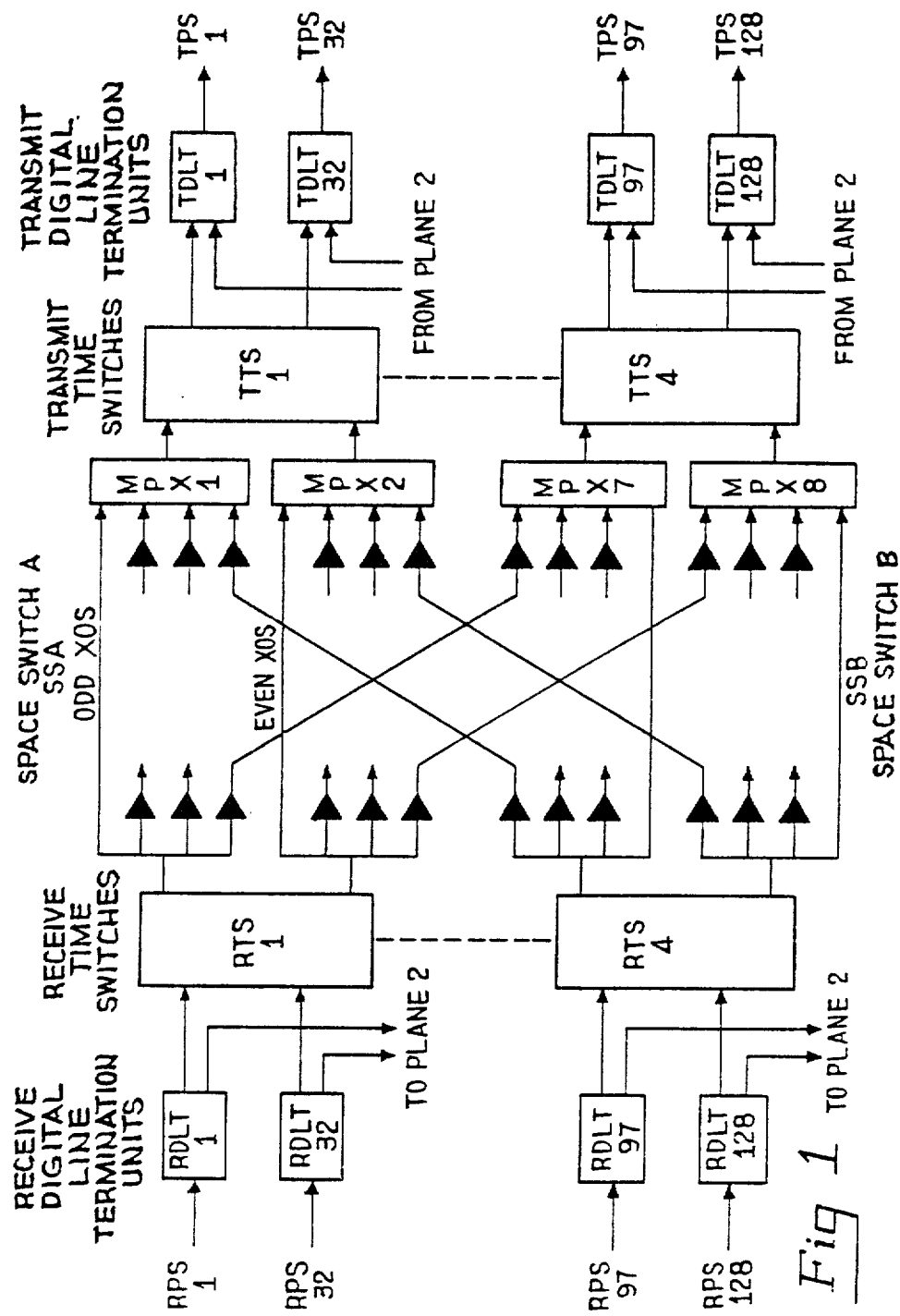

United States Patent [19]

Chopping et al.

[11] 4,365,330

[45] Dec. 21, 1982

[54] CHANNEL ZERO SWITCHING ARRANGEMENTS FOR DIGITAL TELECOMMUNICATION EXCHANGES

[75] Inventors: Geoffrey Chopping, Poole; Robert V. Moberly, Broadstone; Alexander S. Philip, Wimborne, all of England

[73] Assignee: The Plessey Company plc, Ilford, England

[21] Appl. No.: 175,718

[22] Filed: Aug. 6, 1980

[30] Foreign Application Priority Data

Aug. 10, 1979 [GB] United Kingdom ............. 7927860

[51] Int. Cl.³ .............................................. H04J 3/06
[52] U.S. Cl. ..................................... 370/100; 370/58
[58] Field of Search ................. 370/100, 58, 63, 65, 370/66, 59

[56] References Cited

U.S. PATENT DOCUMENTS 4,048,445 9/1977 Ghisler ................................ 370/63
4,131,763 12/1978 Herschtal ........................... 370/100

OTHER PUBLICATIONS

System X, J. Martin, UDC 621.395.34, pp. 221-224.
30-Channel Pulse-Code Modulation System, E. C. Vogel and R. W. McLintock, pp. 5-11, UDC 621.376.56.
"System X: Subsystems" by Risbridger, Post Off. Elect. Eng. J. (G.B.) pp. 19-26.

*Primary Examiner*—Douglas W. Olms
*Attorney, Agent, or Firm*—Fleit & Jacobson

[57] ABSTRACT

It is an emerging international telecommunications requirement that all 32 channels of the p.c.m. multiplex must be switchable. The switching of channel zero relates to the "spare bits" not defined for synchronization purposes and these bits may be used as a databearer for network administration or control purposes. Digital telecommunication switching network, therefore, must be capable of concentrating channel assemblies of these spare bits into one transmit multiplex which may be connected to a spare bit data processor remote from the switching network or co-located with it. The passing of channel zero into the switch block, however, is dangerous because if this data is passed across the switch block to another digital line termination unit DLT in a time slot other than channel zero, then that receiving DLT will be called upon to transmit data containing two valid sets of sync and non-sync patterns which could confuse the synchronization circuits associated with the digital transmission system connected to that DLT. Such an arrangement is prevented using equipment in the receive and transmit DLT's. In the receive DLT after the incoming synchronization channel has fulfilled its synchronization purpose it is deliberately modified such that when switched to a transmit multiplex it will not be erroneously recognized as a sync channel. The modification does not of course cause loss of information contained in the spare bits or alarm bit. At the transmit DLT a decision is made as to whether the international bit in the sync pattern and the international bit and spare bits in the non-sync pattern should be transmitted to line as data ones or the patterns received.

5 Claims, 2 Drawing Figures

CHANNEL ZERO SWITCHING ARRANGEMENTS FOR DIGITAL TELECOMMUNICATION EXCHANGES

The present invention relates to a method of operating telecommunication exchange systems handling digital information, such as time division multiplex pulse code modulated speech and is more particularly concerned with the switching of channel zero of such a multiplex.

In the internationally accepted standard thirty-two channel multiplex thirty channels are used for encoded speech samples while two channels are used for administration purposes. The two channels used for administration purposes are defined as channels zero and sixteen. Channel sixteen is used as a common signalling channel for the remaining thirty speech channels whereas channel zero is used to convey synchronisation information. The arrangement for channel zero is that its most significant bit is an international bit and it carries a characteristic bit pattern in its least significant seven bits in each even frame. Channel zero in the odd frames carries an international bit, a marker bit, an alarm bit and five spare bits.

It is an emerging international requirement that all thirty-two channels of a pulse code modulation multiplex be switchable. The switching of channel zero relate to the use of its spare bits not defined for synchronisation purposes but available as a data bearer for network administration or control purposes.

The passing of channel zero into a digital switching network is hazardous because if this data is passed across the switching network in a time slot other than time slot zero then the equipment handling the outgoing multiplex to which the channel zero information has been switched will transmit a multiplex containing two valid sets of synchronisation patterns. The digital line termination equipment in digital switching exchanges are arranged to search for and to synchronise to the synchronisation pattern handled by channel zero of a p.c.m. multiplex. Obviously the handling of two such patterns in each even frame will lead to synchronisation problems.

According to the invention there is provided a method of switching the incoming channel used to carry synchronisation patterns of a multi-channel time division multiplex pulse code modulated line transmission system to any one of the outgoing channels of a multi-channel time division multiplex pulse code modulated line transmission system in a telecommunications exchange using a digital switching network, the method comprising the steps of (a) amending the pattern in a predetermined manner in the said incoming channel received at the exchange, (b) switching the said incoming channel carrying the amended pattern across the exchange switching network to a selected outgoing channel and (c) transmitting the amended pattern in the selected outgoing channel if that channel is not a channel used to carry synchronisation patterns for the outgoing line transmission system.

Figure 2:
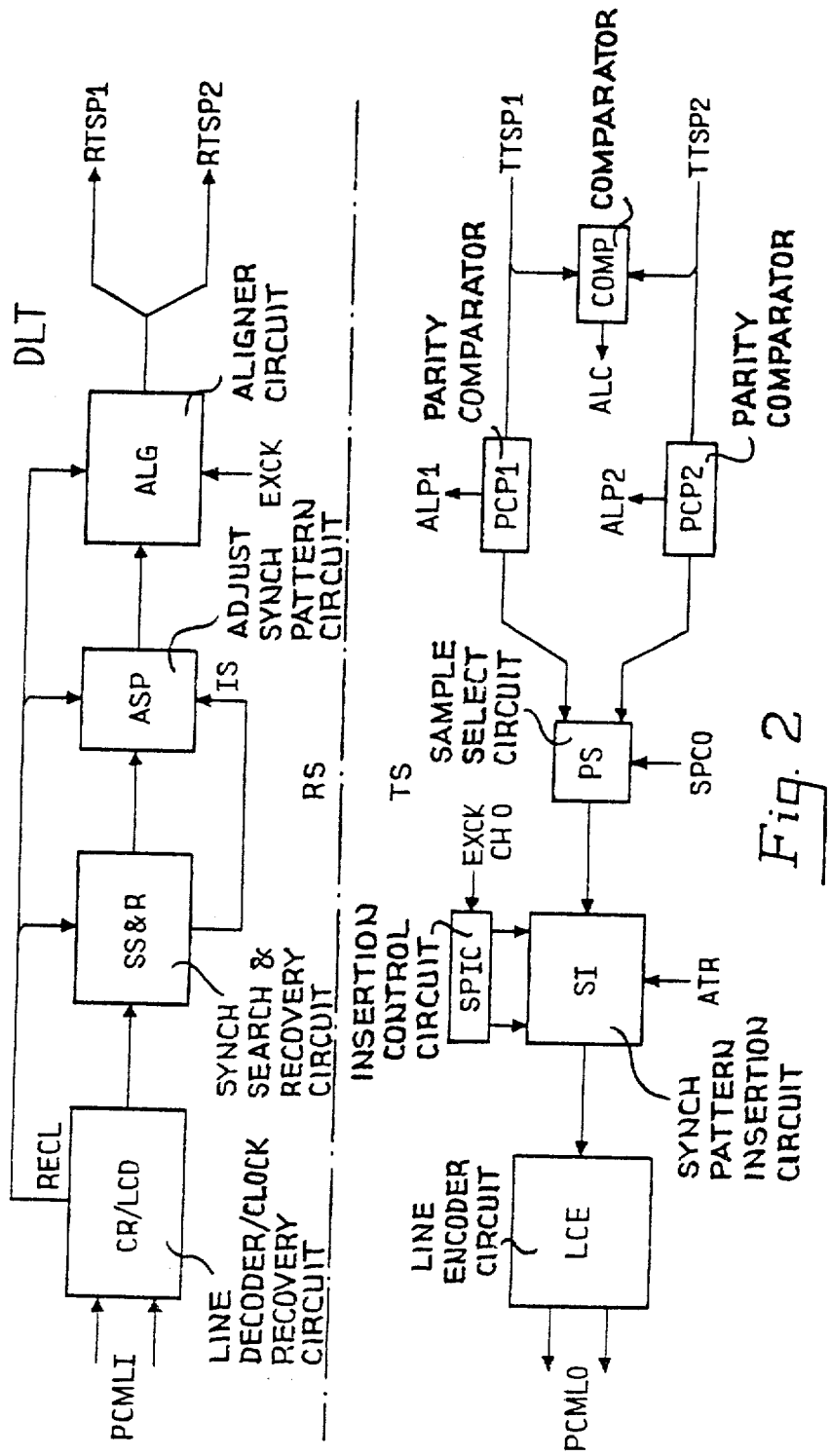

The invention will be more readily understood from the following description which should be read in conjunction with the accompanying drawings. Of the drawings:

FIG. 1 shows in block diagram form a digital switching network suitable for use in one embodiment of the invention while, FIG. 2 shows a block diagram of a digital line termination unit.

One embodiment of the invention finds application in the family of digital switching exchanges known as "System X". The basic concept behind this family of exchanges is disclosed in the Post Office Electrical Engineers Journal Vol. 71 Part 4 January 1979 in an article entitled "System X" by J. Martin commencing at page 221. The present invention resides in the digital switching sub-system (DSS) for that exchange family and a block diagram of the switch block for one embodiment of the DSS is shown in FIG. 1. The switch block is made up of receive digital line termination units RDLT1-128, receive time switches RTS1-4, space switches SSA and SSB, transmit time switches TTS1-4 and transmit digital line termination units TDLT1-128 to provide a switch block with a speech traffic switching capability of 1,000 through erlangs approximately. The time and space switching functions are duplicated and only one plane is shown in FIG. 2 but the leads referenced TP2 indicate the access points to the second plane (i.e. plane 2).

Digital line termination units

The incoming p.c.m. line systems RPS1-128 are each terminated upon an individual receive digital line termination units RDLT 1 to 128. Each receive digital line termination unit provides (i) the interface to the incoming PCM line system (ii) error detection and alarm indications both internal for the DSS and external for the transmission line systems for passage to the alarm monitor unit AMU, (iii) pattern insertion for path checking and loop-back facilities for fault location and diagnostics and (iv) frame alignment using an elastic buffer store to align incoming information to the exchange clock.

The outgoing p.c.m. line systems TPS1-128 are fed from the transmit digital line termination units TDLT 1 to 128. Each transmit digital line termination unit provides (i) the interface to the outgoing PCM line system, (ii) signalling injection arrangements for the outgoing line system and (iii) accepts the two samples from the duplicated planes compares the samples and selects for transmission the sample having good parity. The outgoing digital line transmission units also include arrangements allowing the unit to be biased to select one of the planes to the exclusion of the other to supply the speech samples for transmission.

Time Switch

There are three phases of timing through the trunking and these are:

(i) time of reception of the sample from the incoming line (ii) time allocated by the control for transfer of the sample across the exchange and (iii) time of transmission of the sample to the outgoing line.

The receive and transmit speech stores are used to provide the required buffering between these events.

The transmit and receive digital line termination units are of course combined as they serve the outgoing and incoming p.c.m. line systems of a particular exchange junction route. A block diagram of the equipment used in a digital line termination unit is shown in FIG. 2. The digital line termination unit is divided into two basic sections RS (receive section) and TS (transmit section).

Digital line termination unit receive section

This section consists of a line decoder/clock recovery circuit CR/LCD, a synchronisation search and recovery circuit SS&R, an adjust synchronisation pattern circuit ASP and an aligner circuit ALG.

The line decoder/clock recovery circuit CR/LCD is used in its line decoder function to convert the line signals into binary signals together with providing isolation between the p.c.m. system incoming line PCMLI and the DLT logic. Typically the line may handle high density bipolar encoded digital signals or so-called HDB3 encoding which is converted into a serial binary string. The p.c.m. system employed typically is described in the Post Office Electrical Engineers Journal Vol. 71 Part 1 April 1978 in an article entitled "30 Channel Pulse Code Modulation System" by E. C. Vogel and R. W. McLintock starting on page 5. The HDB3 incoming information is also subject to clock recovery by applying the incoming information to a ringing circuit. The recovered clock signals are shaped and used to provide the clock drive on lead RECL for the remaining circuits of the receive section RS.

The synchronisation search and recovery circuit SS&R is used to search for and to lock on to the synchronisation pattern used in channel O of the incoming p.c.m. system. Reference to the article mentioned previously in Vol 71 Part 1 of the Post Office Electrical Engineers Journal at FIG. 1 of that article shows that in alternate frames the frame alignment word is Y0011011 where Y is reserved for the international bit. The circuit SS&R is used to monitor the output of the line converter circuit CR and to search for and to lock on to the synchronisation pattern and it is used to indicate to the exchange alarm control equipment (not shown) when synchronisation is lost. The output from the SS&R circuit is applied to the adjust synchronisation pattern circuit ASP.

The adjust synchronisation pattern circuit ASP is used to detect and adjust the synchronisation pattern in channel O before it is fed on to the aligner ALG. Typically the adjust synchronisation pattern circuit is provided with an "in synchronisation signal" IS from the SS&R circuit together with the recovered clock signals. The ASP circuit includes a counter driven by the recovered clock signals and arranged to generate an indication when the data for channel zero is passing through the ASP circuit. This indication is used to control an inversion circuit which inverts the state of bit 3 of channel zero if bit 2 of channel zero is "O". This means that the synchronisation pattern transmitted in alternate channel zero's is corrupted from a Y0011011 pattern to a Y0111011 pattern before being applied via the aligner ALG to the receive time switch stores of the switch block. This now allows the switch block to switch channel zero information across the network into non channel zero transmit time slot locations allowing up to thirty channel zero's to be assembled into a single outgoing p.c.m.line system. Such a system may then be connected to a spare bit processor allowing the spare bits in every other "non-synchronisation pattern" channel zero of an incoming p.c.m. system to carry network administration or control data. Channel zero when used in a non-synchronisation mode (i.e. every other frame) takes the form of Y1AXXXXX where Y is the international bit, A is an alarm bit and X are spare bits which may be used to carry the network administration and control information. The serial data stream output from the adjust synchronisation pattern circuit ASP is applied to the aligner ALG.

The function of the aligner ALG is to align the incoming binary data stream with the internal exchange clock EXCK. Numerous arrangements are suitable for providing such an arrangement and conceptually the aligner is an "elastic-length" buffer store which compensates for the difference between the frame phases of the received multiplex and the DSS exchange clock. The store is written to according to the bit rate and frame start derived from the clock recovery circuit CR and is read under the control of the DSS exchange clock EXCK. The aligner may consist of a single chip containing a set of serial shift registers together with read and write address counters and associated logic. The output from the aligner is used to drive the two plates P1 and P2 of the switch block over leads RTSP1 and RTSP2.

Digital line termination unit transmit section

This section consists of a comparator COMP receiving the speech samples from the two planes P1 and P2, a pair of parity comparators PCP1 and PCP2, a sample select circuit PS, a synchronisation pattern insertion logic SI and a line encoder circuit LCE.

The comparator COMP together with the parity comparators PCP1 and PCP2 are used to compare the two samples produced from the two planes P1 and P2 of the switch block and to check the parity of each of the samples allowing the sample selector PS to select one or other of the samples for passage to the outgoing p.c.m. line PCMLO dependent upon the results of the comparison and the parity check.

The synchronisation pattern insertion circuit SI is used to decide whether the international bit in the synchronisation pattern and the international and spare bits in the non-synchronisation pattern (i.e. alternative channel zero's) should be transmitted to line as data ones or the patterns, if any, being sent across the switch block. Associated with the SI circuit is a synchronisation pattern insertion control circuit SPIC which is programmed with the pattern to be inserted. The synchronisation insertion circuit operates as follows if the synchronisation pattern supplied from the switch block every other time slot zero is not of the adjusted type then the synchronisation bits are derived from the insertion control circuit SPIC. The alternation of Sync. and Non-Sync. transmitted onto the PCM is determined by the Transmit HDB3 Circuit and the above Bits have to be re-timed before being given to the HDB3 circuit.

This is achieved by using a one bit register and a six bit register. The one bit register is loaded with the International Bit every time an adjusted Sync. pattern is received in Time Slot Zero.

The six bit register is loaded with the other International Bit and the Spare Bits when an adjusted Sync. pattern is not received in Time Slot Zero and an adjusted Sync. pattern was received in the previous Time Slot Zero.

When the adjusted Sync. pattern is not received for two successive Time Slot Zeros, the one bit register and the six bit register are both loaded with ones.

From the above it can be seen that the incorporation of the synchronisation pattern adjustment circuit in the receive path of the digital line termination unit of a digital switching exchange allows the synchronisation channel to be switched across the exchange not only spatially but also to a different channel allowing multiplexes of separate channel zero's to be made up for concentration and the passage of network control and administration information without disturbing the network synchronisation arrangements.

What we claim is:

1. A method of switching the incoming channel used to carry synchronisation patterns of a multi-channel time division multiplex pulse code modulated line transmission system to any one of the outgoing channels of a multi-channel time division multiplex pulse code modulated line transmission system in a telecommunications exchange using a digital switching network comprising the steps of (a) amending the pattern in a predetermined manner in the said incoming channel received at the exchange, (b) switching the said incoming channel carrying the amended pattern across the exchange switching network to a selected outgoing channel and (c) transmitting the amended pattern in the selected outgoing channel if that channel is not a channel used to carry synchronisation patterns for the outgoing line transmission system.

2. A method as claimed in claim 1 in which the pattern is amended by inverting the state of a selected one of the bits in the incoming channel carrying the synchronisation pattern.

3. A telecommunications switching system operating in accordance with the method according to claims 1 or 2 in which the switching network comprises a time and space division switching stages and each incoming line transmission system is terminated on a receive digital line termination unit which includes means for detecting a synchronisation pattern and means for adjusting each synchronisation pattern in a predetermined manner.

4. A telecommunications switching system according to claim 3 in which the means for adjusting comprises a counter arranged to generate an indication when the data for the synchronisation channel is received and an inversion circuit arranged to invert the state of bit 3 of the sychronisation channel if bit 2 is in the zero state.

5. A telecommunications switching system according to claim 4 in which each outgoing line transmission system is driven by a transmit digital line termination unit which includes means for inserting a synchronisation pattern in the outgoing synchronisation channel.

* * * * *